(12) United States Patent
Moran et al.

(10) Patent No.: US 7,320,491 B2
(45) Date of Patent: Jan. 22, 2008

(54) OBJECT HANDLING APPARATUS AND METHOD

(75) Inventors: Robert Moran, Crumlin (GB); Barbara Moran, Crumlin (GB)

(73) Assignee: Mo Team Limited, Crumlin (GB)

( * ) Notice: Subject to any disclaimer, the term of this patent is extended or adjusted under 35 U.S.C. 154(b) by 300 days.

(21) Appl. No.: 10/520,247

(22) PCT Filed: Jul. 4, 2003

(86) PCT No.: PCT/EP03/07262

§ 371 (c)(1),
(2), (4) Date: Jan. 3, 2005

(87) PCT Pub. No.: WO2004/004983

PCT Pub. Date: Jan. 15, 2004

(65) Prior Publication Data

US 2005/0232738 A1    Oct. 20, 2005

(30) Foreign Application Priority Data

Jul. 4, 2002    (GB) ................................ 0215419.3

(51) Int. Cl.
*B65G 1/12* (2006.01)

(52) U.S. Cl. .................................. 294/87.26; 414/908

(58) Field of Classification Search .................. 414/27, 414/416.02, 749.5, 908, 790.2, 792.9, 736; 198/468.3; 294/87.26
See application file for complete search history.

(56) References Cited

U.S. PATENT DOCUMENTS

| | | | | |
|---|---|---|---|---|
| 4,290,734 A | * | 9/1981 | Van Breen | .................. 414/800 |
| 4,354,603 A | * | 10/1982 | Dunn | ........................ 211/1.51 |
| 4,645,401 A | * | 2/1987 | Hopkins et al. | ........ 414/222.12 |
| 4,865,509 A | | 9/1989 | Carlton | |
| 5,259,719 A | | 11/1993 | Akagawa | |

FOREIGN PATENT DOCUMENTS

| | | |
|---|---|---|
| JP | 05-318375 | 12/1993 |
| JP | 07-153073 | 6/1995 |

* cited by examiner

*Primary Examiner*—James Keenan
(74) *Attorney, Agent, or Firm*—RatnerPrestia

(57) ABSTRACT

A method and an apparatus for handling objects, in particular discs such as CD's having an aperture therein defining a rim. The apparatus comprises a first set of jaws moveable towards and away from one another and a second set of jaws moveable towards and away from one another. In use, the jaws of each set may be moved apart to exert a radial gripping force on the rims of the objects. The second set of jaws is extendible and retractable axially. By operating the sets of jaws through sequences of extension, gripping, retraction and releasing, the objects can be loaded onto or off of the apparatus. The gripping action of the jaws allows the apparatus to hold the objects in any orientation.

12 Claims, 4 Drawing Sheets

OBJECT HANDLING APPARATUS AND METHOD

Figure 1:
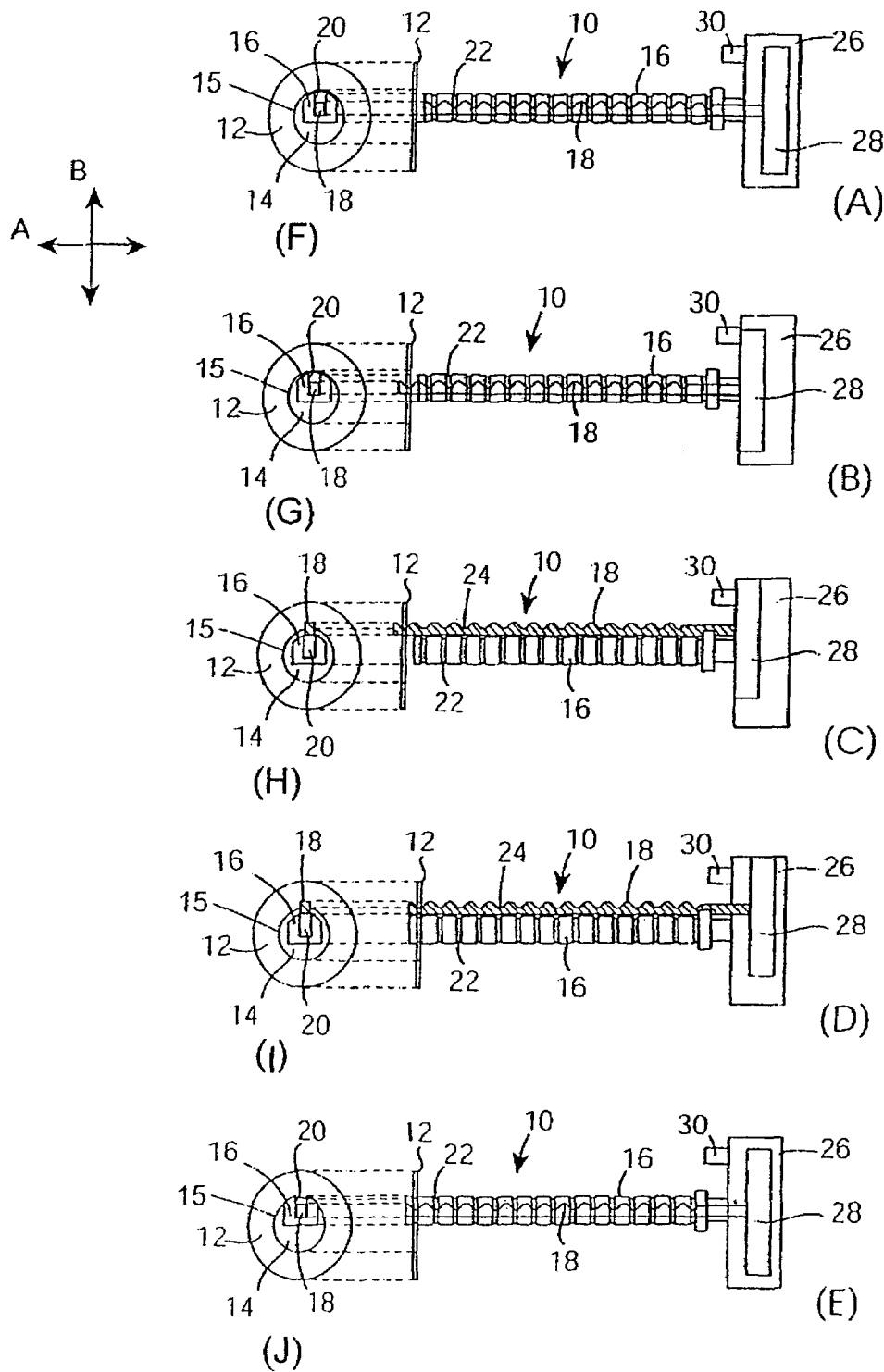

BACKGROUND OF THE INVENTION (1) Field of the Invention

The present invention concerns an object handling apparatus and method, and in particular an object handling apparatus and method adapted to stack and/or unload objects such as discs having at least one aperture therein defining an inner rim, such as compact discs, dvd's, floppy discs, mobile phone covers, etc.

(2) Description of Related Art

The production and post production handling of such mass produced objects invariably involves the use of automated robotic equipment in manipulating and/or transporting the objects during the various manufacturing stages. The faster the objects can be handled by such equipment, the greater the manufacturing output, and therefore the more cost effective the entire manufacturing operation.

However, conventional robotic arms or the like are only capable of handling individual objects. Thus, in use, the arm grips the first object, and then transports the object to another location, before returning to collect the next object. This process is repeated continually until all of the objects have been transferred to the required location.

The method and apparatus of the present invention enable a large number of a particular object to be handled at once, thus dramatically reducing the number of operations required to transfer a given number of the objects from one location to another, and thus the time and cost of manufacture.

BRIEF SUMMARY OF THE INVENTION

The present invention therefore provides, in a first aspect, an apparatus for handling objects, each object having an aperture therein defining a rim, the apparatus comprising a support on which, in use, one or more objects may be stacked, or unloaded from; an arm located adjacent the support; and control circuitry adapted to effect extension of the arm through the aperture of at least one of the objects, displacement of the arm into engagement with the rim of the at least one object, retraction of the arm such as to position the rim over the support, and displacement of the arm such that the rim is engaged by the support.

Preferably, the arm and the support are elongate, and are substantially parallel to one another.

Preferably, the arm is provided with a plurality of indentations spaced apart along the length thereof.

Preferably, the support is provided with a plurality of indentations spaced apart along the length thereof.

Preferably, the apparatus is provided with a sensor which is adapted to detect when a preset number of objects have been stacked on the support.

Preferably, the arm is comprised of a first set of jaws movable relative to one another.

Preferably, the support is comprised of a second set of jaws movable relative to one another and the first set of jaws.

Preferably, the support is substantially penannular in cross-section such that the arm, when retracted, is substantially recessed within the support.

According to a second aspect of the present invention, there is provided a method of handling objects, each object having an aperture therein defining a rim, the method comprising the steps of providing an apparatus according to the first aspect of the invention; extending the arm through the aperture of at least one of the objects; displacing the arm into engagement with the rim of the at least one object; retracting the arm such as to position the rim over the support; and displacing the arm such that the rim is engaged by the support.

Preferably, the arm is extended through the aperture in a first direction; the arm is displaced in a second direction, substantially perpendicular to the first direction, such as to engage the rim; the arm is retracted in the first direction; and the arm is displaced in the second direction such that the rim is engaged by the support.

Preferably, the method comprises the steps of providing the arm as a first set of jaws moveable relative to one another; providing the support as a second set of jaws moveable relative to one another and the first set of jaws; in engaging the arm with the rim, advancing the first set of jaws away from one another such as to engage the rim at two locations; following retraction of the arm, advancing the second set of jaws away from one another, such as to engage the rim at two locations; and in retracting the arm, advancing the first set of jaws towards one another, such as to disengage the rim.

Preferably, the method comprises the steps of providing a plurality of indentations spaced apart along the length of the arm.

Preferably, the method comprises the steps of providing a plurality of indentations spaced apart along the length of the support.

As used herein, the term "aperture" is intended to mean an opening in an object through which another object may pass, and is not intended to be limited to apertures which are closed on all sides, and could for example cover an aperture formed within, and by, a penannular object.

As used herein, the term "circuitry" is intended to cover electrical, mechanical, hydraulic, and pneumatic equipment, whether individually or in combination, which is arranged and adapted to effect the displacement of mechanical components, and could for example include servo motors, solenoids, hydraulic/pneumatic rams, in addition to any other control equipment necessary to operate the above devices.

BRIEF DESCRIPTION OF SEVERAL VIEWS OF THE INVENTION

Figure 2:
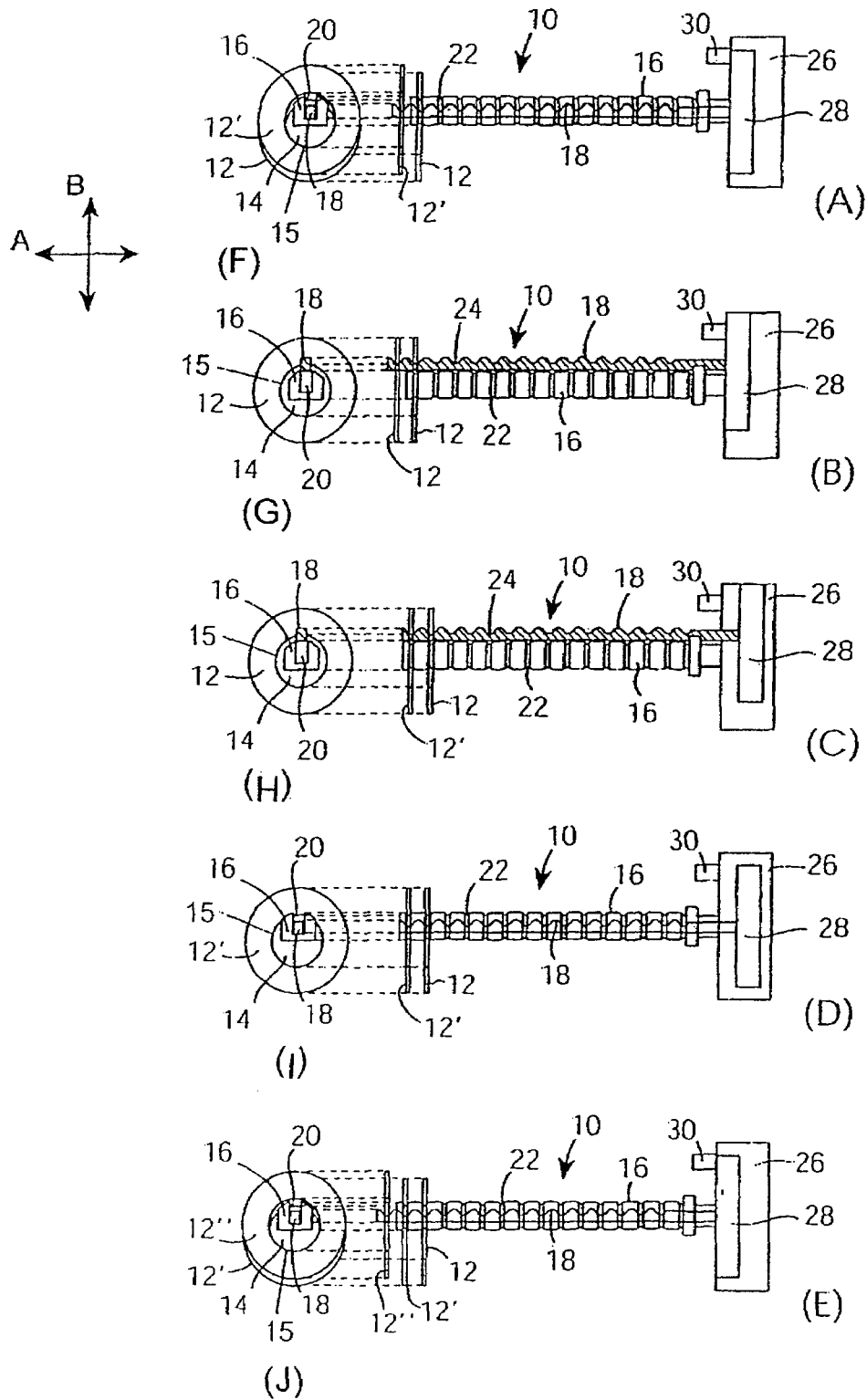
Figure 3:
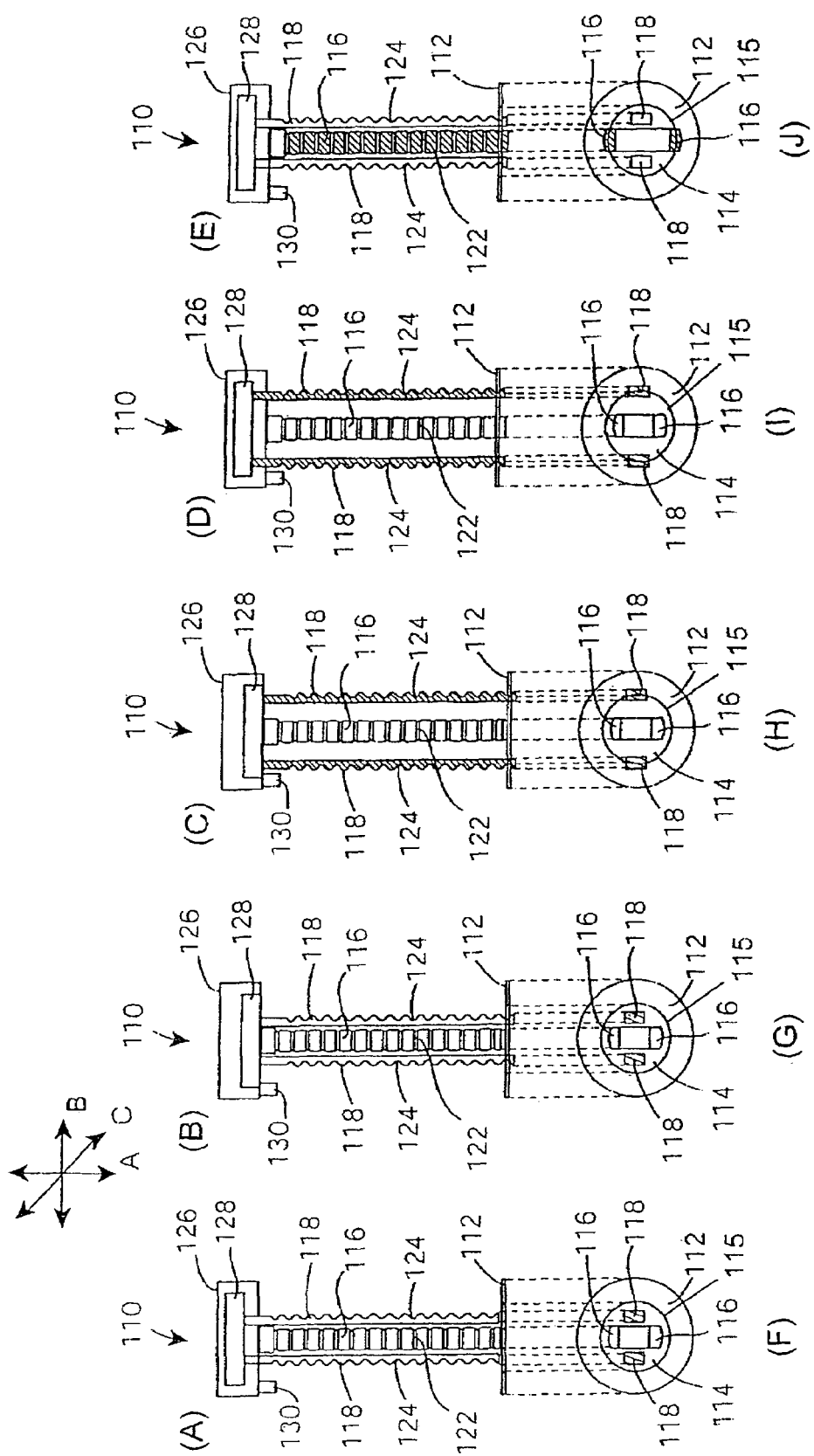
Figure 4:
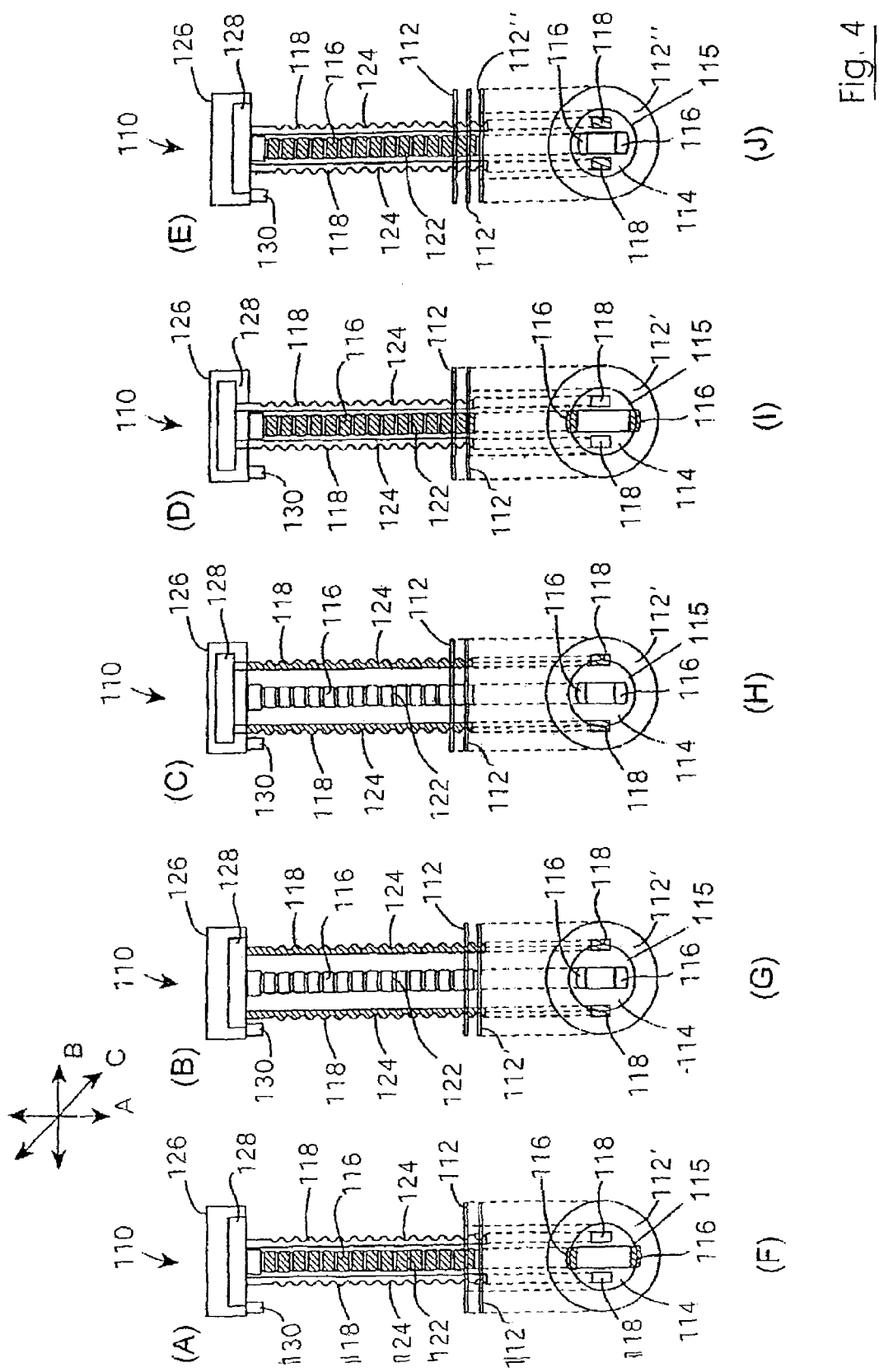

The present invention will now be described with reference to the accompanying drawings, in which;

FIGS. 1 (A)-(E) illustrate a respective side elevation of five sequential operations of a first embodiment of an apparatus, in stacking an apertured disc onto the apparatus;

FIGS. 1 (F)-(J) each illustrates a corresponding end view of the apparatus of FIGS. 1 (A)-(E) respectively;

FIG. 2 (A)-(E) illustrate a respective side elevation of five sequential operations of the apparatus of FIG. 1 in stacking a second apertured disc on the apparatus;

FIGS. 2 (F)-(J) each illustrates a corresponding end view of the apparatus of FIGS. 2 (A)-(E) respectively;

FIG. 3 (A)-(E) illustrate a respective side elevation of five sequential operations of a second embodiment of an apparatus according to the present invention, in stacking an apertured disc onto the apparatus; and FIGS. 3 (F)-(J) each illustrates a corresponding end view of the apparatus of FIGS. 3 (A)-(E) respectively;

FIG. 4 (A)-(E) illustrate a respective side elevation of five sequential operations of the apparatus of FIG. 3 in stacking a second apertured disc onto the apparatus;

FIGS. 4 (F)-(J) each illustrates a corresponding end view of the apparatus of FIGS. 4 (A)-(E) respectively;

DETAILED DESCRIPTION OF THE INVENTION

Referring then to FIGS. 1 and 2 of the accompanying drawings, there is illustrated a first embodiment of an object handling apparatus, generally indicated as 10, which, in use, one or more objects such as discs 12, each having an aperture 14 therein defining a rim 15, may be stacked on and/or unloaded from. The apparatus 10 is primarily intended to be used in a substantially horizontal orientation. The purpose of the apparatus 10 is to pick up and stack one or more of the discs 12, which in practice will take the form of articles such as CD's (compact discs), DVD's (digital video discs), computer discs, mobile phone covers, etc, (not shown). The apparatus 10 is primarily intended to form an integral component of an assembly line (not shown), and may be articulated to move the discs 12 stacked thereon from one located to another, and to then unload the discs 12 as required. For example, during the production of CD's or DVD's, once the requisite information (e.g. music, computer software, etc.) has been "burnt" onto the disc 12, the disc 12 will normally be transferred to a packaging assembly line, where the disc 12 is inserted into a suitable case or the like (not shown). Some form of machine or robotic arm (not shown) will conventionally be utilised to effect the transfer, and indeed the large number of additional transfers required in any high volume assembly line operation. The apparatus 10 would therefore likely be utilised on the end of a suitably modified robotic arm in place of conventional grippers (not shown). As will be described in detail hereinafter, the apparatus 10 is preferably provided with control circuitry (not shown), which may be comprised of electrical components (e.g. servo motors), hydraulic or pneumatic rams (not shown) or any other functional equivalents, in order to operate the apparatus 10, all of which are conventionally utilised in powering robotic arms or the like, ensuring that the apparatus 10 may be easily retrofitted to existing equipment, or integrated into an existing assembly line.

The apparatus 10 primarily comprises an elongate support 16 which, in use, the discs 12 are stacked on and/or unloaded from. The support 16 includes a plurality of indentations in the form of grooves 22 equally spaced from one another along the length of the support 16, into each of which grooves 22 a single disc 12 may be seated, as will be described in greater detail hereinafter. The apparatus 10 further comprises an elongate arm 18 which is adapted, again as will be described in detail hereinafter, to retrieve a disc 12 from a given location and stack said disc 12 onto the support 16, and repeating this stacking with a plurality of the discs 12, before transferring same to another location. The arm 18 includes a plurality of indentations 24 within each of which a single disc 12 is seated during transport onto or off the support 16. The grooves 22 and indentations 24 prevent, during use, any of the discs 12 seated on either the support 16 or arm 18 from contacting, and therefore possibly damaging, one another.

The support 16 and arm 18 are disposed, in the embodiment illustrated, in parallel to one another, the arm 18 being moveable relative to the support 16. Specifically, the support 16 is substantially penannular in cross-section, thereby defining a centrally disposed channel 20, within and about which the arm 18 is moveable. Utilising this penannular shape provides a number of advantages. The channel 20 serves to both support and guide the arm 18, while ensuring that the combined cross sectional area of the support 16 and arm 18 is kept to a minimum, in order to permit same to pass through the aperture 14 of each disc 12 as required, and as will be described in detail hereunder. In addition, the channel 20 results in the rim 15 of each disc 12 being contacted at two locations when seated on the support 16, one on either side of the channel 20, thereby providing increased stability to the discs 12 when being transported to any other location.

In the embodiment illustrated, the support 16 is mounted to a body 26, within which is located a base 28 to which the arm 18 is mounted. The base 28 is moveable within the body 26, as indicated above, by such means as hydraulics, pneumatics, or the like, such as to effect movement of the arm 18 relative to the support 16. The apparatus 10 is primarily intended for use in a substantially horizontal position, and as the support 16 and arm 18 are fixed at one end to the body 24, the apparatus is cantilever in form. Therefore, depending on the operating loads experienced by the apparatus, which will vary depending on the number and composition of objects (e.g. discs 12) to be stacked thereon, both the support 16 and arm 18 are preferably formed from a rigid material, for example a metal, a composite, a plastic or reinforced plastic, or indeed any other suitable alternative.

If necessary, depending on the objects with which the apparatus 10 is to be used, a suitable protective coating or layer (not shown), for example rubber or the like, may be provided on the support 16 and arm 18, in particular on the contact surfaces thereof, in order to reduce the possibility of damage to the objects.

Therefore, referring to FIGS. 1(A) and (F), the apparatus 10 is located such that contiguous free ends of the support 16 and arm 18 are located proximal a first disc 12, and in particular the apparatus 10 is located such that the support 16 and the arm 18 are aligned with the aperture 14 in the disc 12. It will of course be appreciated that this initial alignment is likely to be performed via computer control. In this initial state the arm 18 is fully recessed within the channel 20. Referring then to FIG. 1(B), the arm 18 is extended through the aperture 14, in a first direction A, such that the first indentation 24 is coplanar with the disc 12. This extension may be effected by, for example, the extension of a hydraulic/pneumatic ram, a solenoid, or an electric motor (not shown) located internally of the body 26, or alternatively forming part of the robotic arm (not shown) or the like, to which the apparatus 10 is mounted. Referring then to FIGS. 1(C) and (H), the arm 18 is raised upwardly, in a second direction B substantially perpendicular to the first direction A, out of the channel 20, thereby engaging the rim 15 of the aperture 14, within the first indentation 24, such as to pick the disc 12 up from its rest position. Again this displacement is effected by one or more of the devices mentioned above with reference to FIGS. 1(B) and (G). It should be noted that the displacement of the arm 18, such as to contact the rim 15, is preferably in a direction substantially parallel to the plane of the disc 12. This ensures an accurate contact between the rim 15 and base of the indentation 24, thereby ensuring no relative movement between the disc 12 and the arm 18 following the initial contact therebetween. Any such relative movement could cause momentary swinging of the disc 12, which could then contact, and possibly damage, any adjacent disc 12.

Continuing on to FIGS. 1(D) and (I), the arm 18, while remaining out of the channel 20, is retracted in the direction A such as to effectively draw the support 16 through the aperture 14, until the disc 12 is aligned with the first groove 22 on the support 16. It will thus be appreciated that as the disc 12 is drawn over the support 16, such that the support 16 passes through the aperture 14, the support 16 must be shaped and dimensioned to allow passage through the aperture 14. Thus the size and shape of the support 16 will vary depending on the object with which the apparatus 10 is to be used. It will also be apparent that the penannular shape of the support 16 makes efficient use of the available space, having a relatively large cross-sectional area to provide rigidity along the length thereof, while effectively housing the arm 18 in the central channel 20.

Referring now to FIGS. 1(E) and (K), the arm 18 is dropped back into the channel 20 in the direction B, thereby lowering the disc 12 into engagement with the first groove 22 on the support 16. As with displacement of the arm 18 to initially contact and raise the disc 12, the arm 18 is preferably retracted in a direction substantially parallel to the plane of the disc 12, to ensure an accurate transfer of the disc 12 from the indentation 24 of the arm 18, to the respective groove 22 of the support 16, for the reason hereinbefore described. Once the arm 18 is fully retracted within the channel 20, the disc 12 is fully disengaged therefrom. At this point, the apparatus 10 has returned to the initial configuration illustrated in FIGS. 1(A) and (F), but with a disc 12 seated on the support 16, in the first groove 22 thereof. In order to ensure that sufficient stability is provided to the disc 12 while stacked on the apparatus 10, the upper surface of the support 16, in addition to the plurality of grooves 22, is preferably arcuate such as to provide complementary contact along a substantial portion of the rim 15 of the aperture 14.

In order to then stack a second disc 12' and subsequent discs 12 onto the support 16, the above sequential steps are repeated for each disc 12 to be stacked, until the desired number of discs are located on the support 16, or until each groove 22 on the support 16 has been filled. Thus, referring to FIG. 2-(J), the apparatus 10 is illustrated with a first disc 12 seated within the first groove 22 of the support 16, and the second disc 12' being retrieved and stacked onto the support 16. FIGS. 2(A) and (F) shows the arm 18 being extended through the aperture 14 of the second disc 12'. While the arm 18 is being extended in direction A, it is kept retracted within the channel 20, such as not to engage the first disc 12 seated on the support 16.

Referring to FIGS. 2(B) and (G), once the arm 18 has been extended such that the first indentation 24 is coplanar with the second disc 12', the arm 18 is raised in direction B, substantially parallel to the plane of the second disc 12', such as to engage and raise the second disc 12'. However, in raising the arm 18, it can be seen that the first disc 12 is also raised out of the respective groove 22 and is therefore also supported entirely by the arm 18. Referring to FIGS. 2(C) and (H), the arm 18 is retracted in direction A, as hereinbefore described, with the first and second discs 12, 12' therefore being drawn rearwardly relative to the support 16.

Turning then to FIGS. 2(D) and (I), the arm 18 is again lowered into the channel 20 in direction B, thereby resulting in the first and second discs 12, 12' each being lowered into adjacent grooves 22 on the support 16, such as to again return the apparatus 10 to it's initial configuration. Referring to FIG. 2(E) and (J), the above sequence may then be repeated by again extending the arm 18 such as to retrieve a third disc 12". It will therefore be appreciated that as the above sequence is repeated, the plurality of discs 12 will be simultaneously moved rearwardly along the support 16, one groove 22 at a time, towards the body 26.

The apparatus 10 is therefore provided with a sensor 30 mounted to the body 26, which sensor 30 is adapted to detect when the final groove 22 on the support 16 has been filled with a disc 12, thereby indicating that all of the grooves 22 on the support 16 have been filled. Thus the sensor 30 is adapted to generate a signal which may terminate operation of the apparatus 10, generate a signal to which an operator responds, or displace the apparatus 10 to a new location within the assembly line (not shown). The sensor 30 preferably operates as a proximity detector, utilising conventional infrared or ultrasonic technology or the like, although the sensor 30 could be of any other suitable type. For example, the last groove 22 in the support 16 could be provided with a pressure sensor (not shown) or the like disposed therein, which would therefore be operable to determine when the groove 22 had been filled with a disc 12.

At any point during stacking of the apparatus 10 with the discs 12, the above sequence may be reversed in order to unload the discs 12 from the apparatus 10 to any given location. Such reversal of the above sequence would preferably be effected by computer control, for example following transport of the loaded apparatus 10 to another location at which the discs 12 are required.

It will however be appreciated from the foregoing description that the discs 12 remain suspended in position on the support 16 under the influence of gravity, and thus the apparatus 10 is only suited for use in a horizontal orientation.

Referring then to FIGS. 3 and 4 of the accompanying drawings, there is illustrated a second embodiment of an object handling apparatus, generally indicated as 110, for use in stacking and/or unloading objects such as discs 112 from an off horizontal, preferably vertical, orientation. In the second embodiment like components have been accorded like reference numerals, and unless otherwise stated, perform a like function. Thus the apparatus 110 essentially comprises a support in the form of a first pair of jaws 116, and an arm in the form of a second pair of jaws 118 located in parallel spaced relation to the first jaws 116. The first jaws 116 are mounted to a body 126, while the second jaws 118 are mounted to a base 128 disposed within the body 126.

As with the first embodiment, the apparatus 110 is provided with control circuitry (not shown) comprising electrical components (e.g. servo motors), hydraulic or pneumatic rams (not shown) or any other functional equivalents, in order to power the apparatus 110. In particular, the control circuitry (not shown) is operable to control the movement of the first jaws 116 relative to one another and the second jaws 118, and the second jaws 118 relative to one another and the first jaws 116. The apparatus 110 operates on the same basic principal as the apparatus 10 of the first embodiment, with a number of variations described hereunder, in order to enable the apparatus 110 to operate in a non-horizontal position. The apparatus 110 is therefore not dependent on gravity to hold the discs 112 in position thereon.

Referring to FIGS. 3(A) and (F), the apparatus 110 is located such that the free ends of the first jaws 116 and second jaws 118 are located proximal an aperture 114 of the disc 112 to be stacked. Turning then to FIG. 3(B), the second jaws 118 are extended in a direction A such as to pass through the aperture 114 until a first set of indentations 124 are disposed coplanar with the disc 112. Referring to FIGS. 3(C) and (H), the second jaws 118 are then advanced away from one another, in a direction B substantially perpendicular to direction A, such as to engage a rim 115 of the aperture 114, at a pair of oppositely disposed points, as defined by the first set of indentations 124.

The second jaws 118 are then retracted in direction A, as illustrated in FIGS. 3(D) and (I), such as to effectively draw the first jaws 118 through the aperture 114 of the disc 112, until the rim 115 of the disc 112 is aligned with a first set of grooves 122 on the first jaws 116. During this retraction of the second jaws 118, the first jaws 116 are disposed in close proximity with one another in order to prevent fouling thereof with the rim 115. The first jaws 116 are then advanced, as illustrated in FIG. 3(E) and (J), away from one another in a direction C substantially perpendicular to both direction A and B, such as to engage the rim 115 of the aperture 114. The second jaws 118 may then be advanced towards one another in direction B such as to disengage the disc 112, which is then supported solely by the first jaws 116. As detailed above with reference to the first embodiment, the first jaws 116 and the second jaws 118 should be displaced towards and away from each disc 112 in a direction substantially parallel to the plane of the disc 112, in order to prevent any unwanted movement between the disc 112 and the apparatus 110.

Turning then to FIG. 4, the above sequence may then be repeated to stack a second disk 112' and subsequent discs 112. Thus referring to FIGS. 4(A) and (F), with the first disc 112 retained by the first jaws 116, the second jaws 118 are advanced in direction A through the aperture 114 of the second disc 112'. Turning to FIGS. 4(B) and (G), the second jaws 118 are then advanced away from one another in direction B such as to engage both the first and second discs 112, 112' in respective indentations 124. The first jaws 116 are then advanced towards one another in direction C such as to disengage the first disc 112. Turning to FIGS. 4(C) and (H), the second jaws 118 are then retracted in direction A such as to draw the second disc 112' over the first jaws 116. This retraction of the second jaws 118 also draws the first disc 112 further along the first jaws 116.

Referring to FIGS. 4(D) and (I), the first jaws 116 are then advanced away from one another in direction C such as to engage both the first and second disc 112, 112' within respective grooves 122, wherein the second jaws 118 are advanced towards one another in direction B such as to disengage the first and second discs 112, 112'.

Thus the first and second discs 112, 112' are each engaged in a respective groove 122 of each of the first jaws 116, such as to retain the discs 112, 112' stacked in position on the apparatus 110. Again, referring to FIGS. 4(E) and (J), the above sequence may then be repeated to stack further discs 112 onto the apparatus 110, each sequence advancing the plurality of discs 112 upwardly along the first jaws 116. The apparatus 110 is also provided with a sensor 130, mounted to the body 126 and located proximal the final grooves 22 on the first jaws 116, such as to detect the presence of a disc 112 in said grooves 122, and thus generate an appropriate signal to cease operation of the apparatus 110, and optionally transfer the discs 112, 112', 112" to another location for unloading.

It should also be understood that both the first jaws 116 and the second jaws 118, in particular the grooves 122 and indentations 124, may be provided with a layer or coating of protective material, for example rubber or the like, to reduce the possibility of damage to the discs 112 during operation of the apparatus 110.

It will be appreciated that while the apparatus 110 is primarily intended to vertically stack discs 112, it could of course be applied to discs (not shown) in any orientation, including horizontal. It will therefore also be appreciated that the apparatus 110 could be utilised to stack discs 112 which are presented to the apparatus 110 at one orientation, and which discs 112 could subsequently be unloaded from the apparatus 110 at an alternative orientation, which would not be possible with the apparatus 10 of the first embodiment. Therefore, although the configuration and operation of the apparatus 110 is slightly more complex than that of the first embodiment, the apparatus 110 does provided greater versatility.

The invention claimed is:

1. An apparatus for handling objects, each object having an aperture therein defining a rim, the apparatus comprising a first set of jaws configured to move towards and away from one another, a second set of jaws configured to move towards and away from one another, the first set of jaws providing a support on which, in use, one or more objects are configured to be stacked, or unloaded from; said second set of jaws being located adjacent the first set of jaws such that, in use, said second set of jaws and said first set of jaws are configured to pass through said aperture; and means for effecting extension of the second set of jaws through the aperture of at least one of the objects, means for effecting displacement of the laws of said second set of jaws away from another into engagement with the rim of the at least one of the objects, means for effecting retraction of the jaws of said second set of jaws such as to position the rim over the first set of jaws, means for effecting displacement of the jaws of said second set of jaws towards each other; and means for actuating the jaws of said first set of jaws away from one another into engagement with said rim, and for actuating the jaws of said first set of jaws towards each other, wherein during said engagement with said rim, said first set of jaws and said second set of laws each exerts a radial gripping force on said rim.

2. An object handling apparatus according to claim 1 in which the first and second sets of jaws are elongate, and are substantially parallel to one another.

3. An object handling apparatus according to claim 1 wherein the second set of jaws is provided with a plurality of indentations spaced apart along a length thereof.

4. An object handling apparatus according to claim 1 wherein the support is provided with a plurality of indentations spaced apart along the length thereof.

5. An object handling apparatus according to claim 1 wherein the apparatus is provided with a sensor which is adapted to detect when a preset number of objects have been stacked on the support.

6. In an apparatus as claimed in claim 1, a method of handling objects, each object having an aperture therein defining a rim, the method comprising; extending the second set of jaws through the aperture of at least one of the objects; displacing the jaws of said second set of jaws away from one another into engagement with the rim of the at least one object; retracting the jaws of said second set of jaws such as to position the rim over the first set of jaws; displacing the jaws of said first set of jaws away from one another to engage the rim; and displacing the jaws of said second set of jaws towards one another wherein, during said engagement with said rim, said first set of jaws and said second set of jaws each exerts a radial gripping force on said rim.

7. A method according to claim 6, in which the jaws of said second set of jaws are configured to move through the aperture along a first axis, and are configured to move towards and away from one another along a second axis, the first and second axes being substantially perpendicular with one another.

8. A method according to claim 7, in which the jaws of said first set of jaws are configured to move towards and away from one another along a third axis that is substantially perpendicular to said first axis and said second axis.

9. A method as claimed in claim 6, further comprising operating in a first mode of operation in which said rim is gripped by said only second set of jaws; operating in a second mode of operation in which said rim is gripped by both of said first and second sets of jaws; and operating in a third mode of operation in which said rim is gripped by only said first set of jaws.

10. A object handling apparatus as claimed in claim 1, wherein the jaws of said first set of jaws are configured to move towards and away from one another in a direction that is substantially perpendicular to the direction in which the jaws of said second set of jaws are configured to move towards and away from one another.

11. An apparatus as claimed in claim 1, wherein the apparatus is configured to operate in a first mode of operation in which said rim is gripped by only said second set of jaws; a second mode of operation in which said rim is gripped by both of said first and second sets of jaws; and a third mode of operation in which said rim is gripped by only said first set of jaws.

12. An apparatus as claimed in claim 1, wherein said second set of jaws has a free end that is free to extend through the aperture of at least one of said objects when the apparatus first engages with said at least one of said objects.

* * * * *